(12) United States Patent
Kim et al.

(10) Patent No.: US 9,719,517 B2
(45) Date of Patent: Aug. 1, 2017

(54) CANNED-MOTOR PUMP FOR VEHICLE

(71) Applicants: Hyundai Motor Company, Seoul (KR); Kia Motors Corporation, Seoul (KR)

(72) Inventors: Hark Koo Kim, Seoul (KR); Seung Yong Lee, Gyeonggi-do (KR); Chi Myung Kim, Gyeonggi-do (KR); Jong Won Park, Gyeongsangnam-do (KR); Chang Gook Lee, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 302 days.

(21) Appl. No.: 14/324,744

(22) Filed: Jul. 7, 2014

(65) Prior Publication Data

US 2015/0023817 A1    Jan. 22, 2015

(30) Foreign Application Priority Data

Jul. 18, 2013 (KR) .................. 10-2013-0084513

(51) Int. Cl.
*F04D 13/06* (2006.01)
*F04D 29/02* (2006.01)
*H02K 1/14* (2006.01)

(52) U.S. Cl.
CPC ....... *F04D 13/0606* (2013.01); *F04D 13/064* (2013.01); *F04D 29/026* (2013.01); *H02K 1/146* (2013.01); *F05D 2230/20* (2013.01)

(58) Field of Classification Search
CPC ............. F04D 13/0606; F04D 13/0626; F04D 29/669; H02K 15/14
See application file for complete search history.

(56) References Cited

U.S. PATENT DOCUMENTS

| | | |
|---|---|---|
| 3,254,248 A | 5/1966 | Hagen |
| 3,548,229 A | 12/1970 | Evans |
| 4,395,204 A | 7/1983 | Turner |
| 2006/0017339 A1 | 1/2006 | Chordia et al. |
| 2006/0057003 A1 | 3/2006 | Mitsuda et al. |

(Continued)

FOREIGN PATENT DOCUMENTS

| | | |
|---|---|---|
| JP | 09-280190 A | 10/1997 |
| JP | 2003-222095 A | 8/2003 |

(Continued)

*Primary Examiner* — Patrick Hamo
(74) *Attorney, Agent, or Firm* — Mintz Levin Cohn Ferris Glovsky and Popeo, P.C.; Peter F. Corless

(57) ABSTRACT

A canned motor pump that includes a pipe-shaped can part which accommodates a rotor, a plurality of supports protruding radially outward from sides of the can part, and a plurality of the split cores each of which is inserted inside a corresponding support of the supports. Each distal end of the split cores extends in a direction toward a corresponding insulator part. A plurality of insulator parts are respectively formed on distal ends of the supports. An annular outer ring surrounds the outer circumference of the insulator parts. The inner circumference of the outer ring adjoins to exposed outermost ends of the split cores. Coils then are wound on the supports to provide a can motor pump with fewer parts and better performance.

10 Claims, 5 Drawing Sheets

(56) References Cited

U.S. PATENT DOCUMENTS

| | | | |
|---|---|---|---|
| 2008/0075586 A1 | 3/2008 | Fukuki et al. | |
| 2011/0033320 A1* | 2/2011 | Heier | F04D 13/0606 417/410.1 |
| 2012/0180279 A1 | 7/2012 | Tuery et al. | |

FOREIGN PATENT DOCUMENTS

| | | |
|---|---|---|
| JP | 2005-315184 A | 11/2005 |
| JP | 2010-236539 A | 10/2010 |
| JP | 2014-039366 A | 2/2014 |
| KP | 10-2002-0015303 A | 2/2002 |
| KP | 10-1186212 B1 | 10/2012 |
| KR | 20-1992-0018305 U | 10/1992 |
| KR | 20-1993-0007587 U | 4/1993 |
| KR | 10-1995-0003639 A | 2/1995 |
| KR | 10-2000-0007175 A | 2/2000 |
| KR | 10-2003-0066157 A | 8/2003 |
| KR | 10-2004-0103588 A | 12/2004 |
| KR | 10-2005-0105021 A | 11/2005 |
| KR | 10-2006-0009719 A | 2/2006 |
| KR | 10-2007-0064314 A | 6/2007 |
| KR | 10-2008-0051209 A | 6/2008 |
| KR | 10-2009-0002830 A | 1/2009 |
| KR | 10-2010-0050986 A | 5/2010 |
| KR | 10-2011-0055278 A | 5/2011 |
| KR | 10-2012-0113102 A | 10/2012 |
| WO | 01/35515 A1 | 5/2001 |

\* cited by examiner

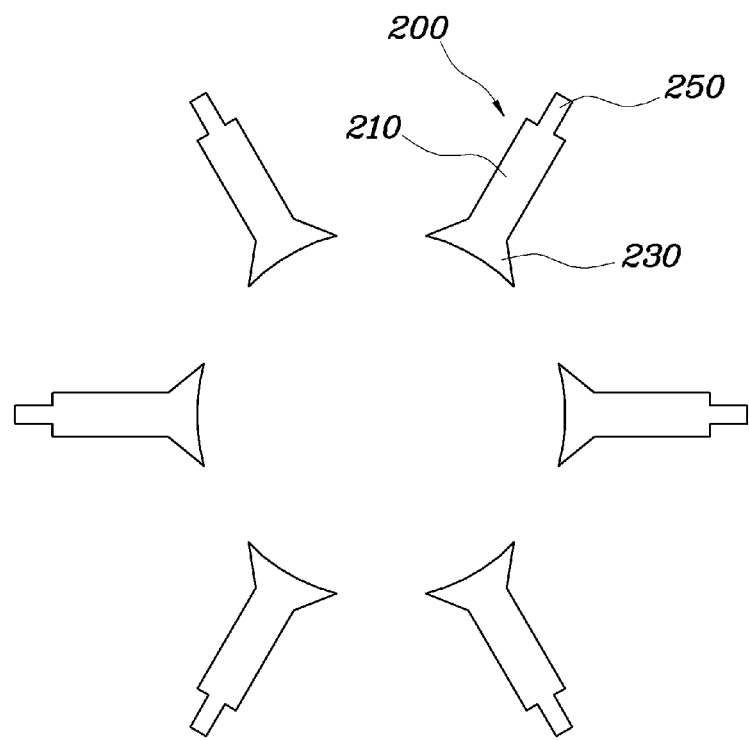

CANNED-MOTOR PUMP FOR VEHICLE

CROSS REFERENCE TO RELATED APPLICATION

The present application claims priority of Korean Patent Application Number 10-2013-0084513 filed on Jul. 18, 2013, the entire contents of which application are incorporated herein for all purposes by this reference.

BACKGROUND OF THE INVENTION

Field of the Invention

The present invention relates to a canned motor pump for a vehicle in which a can structure is interposed between a rotor and a stator.

Description of the Related Art

Most modern day vehicles are provided with a water pump which circulates cooling water and an oil pump which circulates oil. In particular, water pumps, by way of example, the water pump can be divided into engine powered water pumps which operate by receiving power from an engine through a belt connected to an engine rotary shaft and electric water pumps which operate on electricity from a battery. Since the electric water pumps do not require power from the engine, they improve fuel efficiency and the ability to precisely control the temperature of cooling water.

In addition, when a vehicle such as an electric vehicle or a hybrid vehicle which uses a drive motor as a power source is running using purely the power of a motor, the use of an electric motor for the water pump is necessary since the drive motor sometimes turned off during operation.

The structure of a typical canned motor pump is configured such that a can structure is interposed between a rotor and a stator, a hydro unit extends toward the rotor so that the rotor is submerged into water. Here, the can serves as a compartment that separates the rotor from the stator, and is separately fabricated by injection molding.

However, when the can motors are made in the above manner, because the can is made separately and then is inserted into the state core, an assembly gap is created which increases an air gap therebetween. The presence of such an air gap causes vibrations and noise, which are problematic (i.e., vibrations can cause parts to come loose and such noise is not desirable to consumers).

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a canned motor pump in which an assembly gap is minimized to minimize an air gap therein, thereby enhancing performance and reducing noise.

In order to achieve the above object, according to one aspect of the present invention, there is provided a canned motor pump that includes a pipe-shaped can part which accommodates a rotor; a plurality of supports protruding radially outward from sides of the can part and a plurality of the split cores. In particular, each of the plurality of the split cores is inserted inside a corresponding support of the plurality of supports, and each distal end of the plurality of the split cores extends in a direction toward a corresponding insulator part of the plurality of insulator parts. Also included in the canned motor pump is a plurality of insulator parts; an annular outer ring surrounding an outer circumference of the plurality of insulator parts, an inner circumference of the outer ring adjoining to exposed outermost ends of the plurality of split cores; and coils wound on the plurality of supports. Each of the plurality of insulator parts is formed on a corresponding distal end of the plurality of supports.

In some embodiments of the present invention, the can part, the plurality of supports, the plurality of insulator parts and the plurality of split cores may be integrally insert-molded together as one part in which the plurality of split cores are respectively inserted inside the plurality of supports.

Each of the plurality of split cores may include: a winding portion extending a predetermined length in a radial direction of the can part, the winding portion being shaped as a rectangular cross-sectional column; a fixing portion provided on one end of the winding portion that is adjacent to the can part, the fixing portion forming a taper that widens in a direction toward the can part when viewed from above; and a protrusion protruding outward from the other end of the winding portion.

Here, the coils may be respectively wound on the winding portions of the plurality of split cores, and the plurality of supports may be disposed between the plurality of split cores and the coils in order to electrically disconnect the plurality of split cores from the coils.

The protrusions of the plurality of the split cores may respectively penetrate through the plurality of insulator parts so that the outermost ends of the plurality of the split cores are exposed to outside. Outermost surfaces defined by the outermost ends of the protrusions of the plurality of split cores and the plurality of insulator parts may be shaped as an arc that is convex to outside in a lateral direction such that the outermost ends of the protrusions of the plurality of split cores and the outermost surfaces of the insulator parts form one plane.

Alternatively, outermost surfaces defined by the protrusions of the plurality of split cores and the plurality of insulator parts may form a concentric circle with the can part, and the outer ring is fitted on the outermost surfaces of the protrusions of the plurality of split cores and the plurality of insulator parts. Here, the outermost surfaces defined by the outermost ends of the protrusions of the plurality of split cores and the plurality of insulator parts may be in close contact with the outer ring so as to be electrically conductive.

Additionally, in some embodiments, the can part, the supports and the insulator parts may be nonconductors, and the state cores and the outer rings may be conductors. The can part may also have a stepped portion in a lower portion thereof in which an inner diameter is reduced so that an inner cross-sectional area of the can part is reduced to a smaller diameter or radius.

According to the canned motor pump having the above-described structure, the can structure can operate as an insulator and thus no separate insulator is required. It is also possible to reduce the number of processes and parts which are required for the assembly of the separate insulator, thereby reducing manufacturing cost. Additionally, since the outer ring and the divided cores are utilized, it becomes easy to concentrically wind the coils and it becomes possible to minimize any air gaps therebetween, thereby improving the performance characteristic of the motor. Since the number of parts that are required to manufacture a can part are reduce, the assembly gap is removed or minimized, thereby reducing noise. Finally, due to the unified structure, the pump does not create noise and has superior tolerance to vibration and impacts.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a top view of the split core according to an exemplary embodiment of the present invention.

DETAILED DESCRIPTION OF THE INVENTION

Hereinbelow, preferred embodiments of a canned motor pump according to the present invention will be described in detail with reference to the accompanying drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Figure 1:
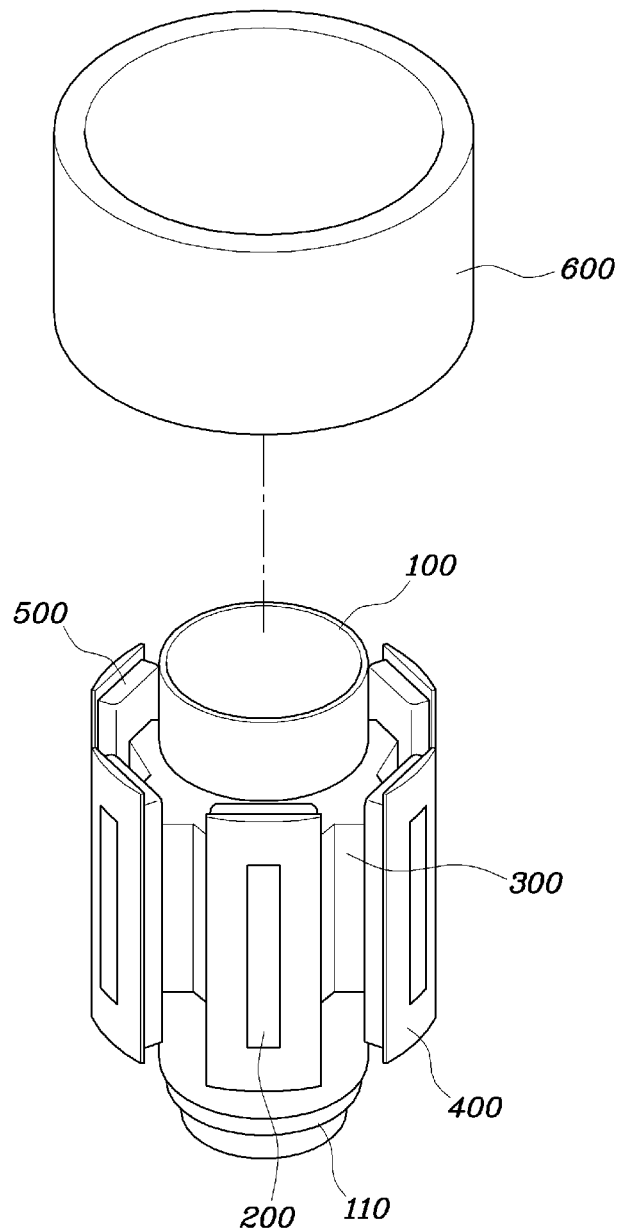
FIG. 1 is an exploded perspective view showing a canned motor pump according to an exemplary embodiment of the present invention.
Figure 2:
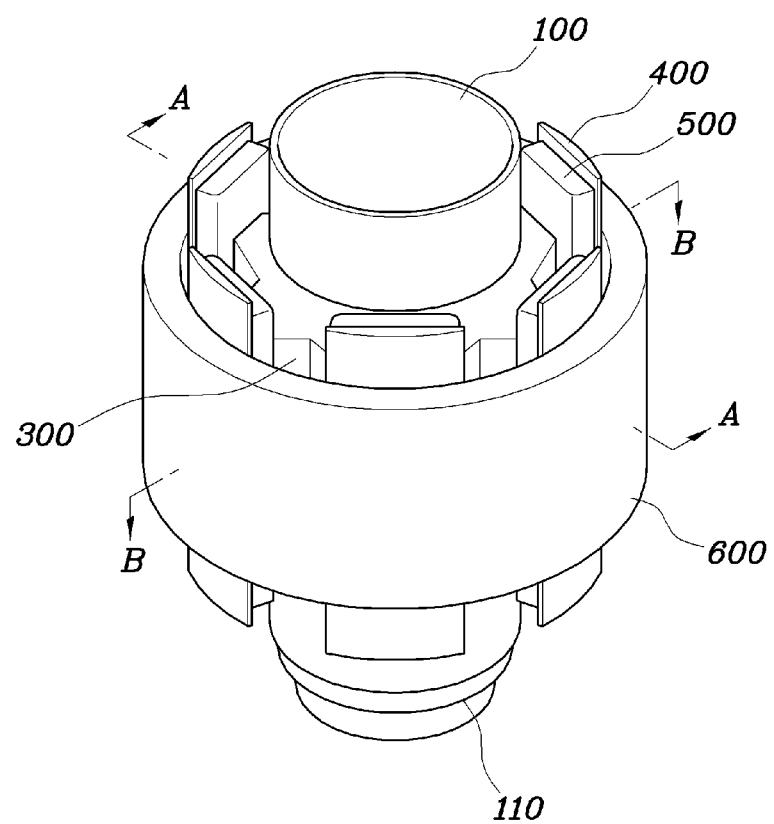
FIG. 2 is an assembled view of the canned motor pump shown in FIG. 1.
Figure 3:
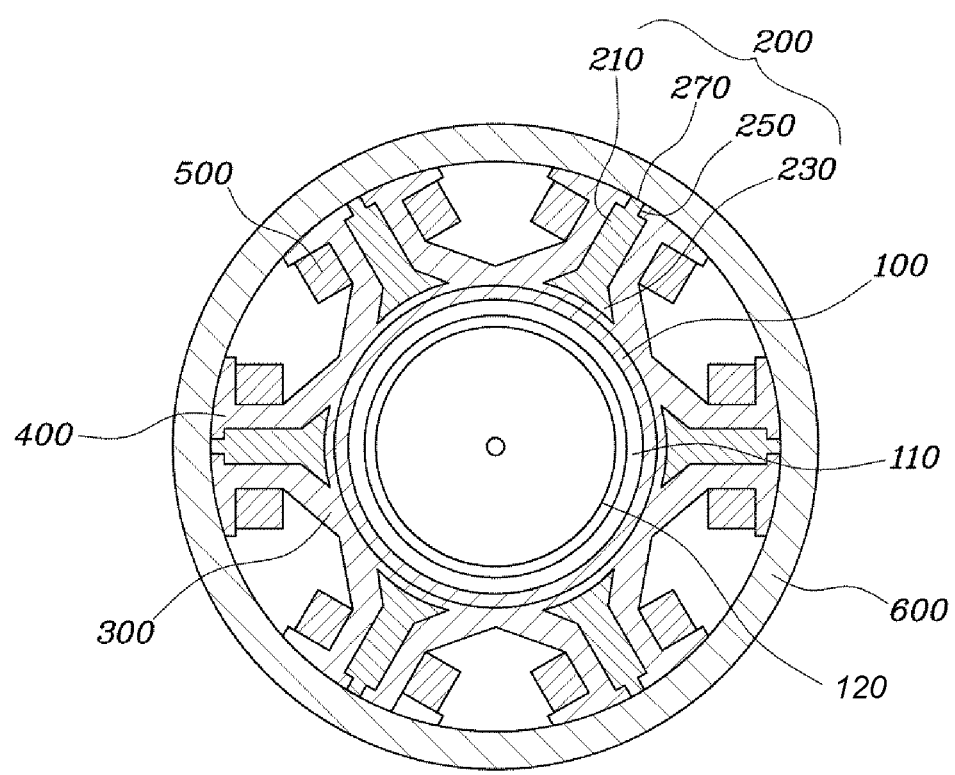
FIG. 3 is a cross-sectional view taken along line B-B in FIG. 2.
Figure 4:
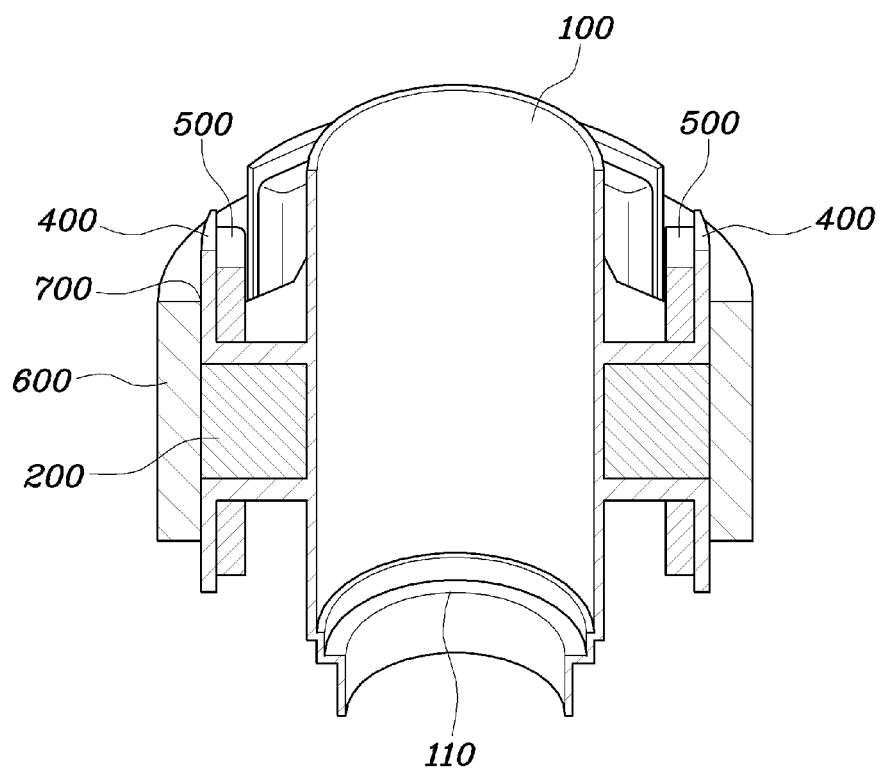
FIG. 4 is a cross-sectional view taken along line A-A in FIG. 2.

FIG. 1 is an exploded perspective view showing a canned motor pump according to an exemplary embodiment of the present invention, FIG. 2 is an assembled view of the canned motor pump shown in FIG. 1, FIG. 3 is a cross-sectional view taken along line B-B in FIG. 2, FIG. 4 is a cross-sectional view taken along line A-A in FIG. 2, and FIG. 5 is a top view of the split core according to an exemplary embodiment of the present invention.

The canned motor pump according to an exemplary embodiment of the present invention includes a pipe-shaped can part 100, a plurality of split cores 200, a plurality of supports 300, a plurality of insulator parts 400, coils 500 and an outer ring 600. The can part 100 accommodates a rotor 120, and the plurality of supports 300 protrudes radially outward from sides of the can part 100. Each of the plurality of insulator parts 400 is formed on a corresponding distal end of the plurality of supports 300. Each of the plurality of the split cores 200 is inserted inside a corresponding support 300 of the plurality of supports 300. Each distal end of the plurality of the split cores 200 extends in the direction toward a corresponding insulator part 400 of the plurality of insulator parts 400. The outer ring 600 has the shape of a ring which surrounds the outer circumference of the plurality of insulator parts 400. The inner circumference of the outer ring 600 adjoins to exposed outermost ends 270 of the plurality of split cores 200. The coils 500 are wound on the plurality of supports 300.

The can part 100 may also have a stepped portion 110 in the lower portion of the can part to reduce the inner diameter of the can part beyond the step portion 110. That is, the inner cross-sectional area of the can part 100 is reduced in the lower portion thereof beyond the step portion 110. It is understood that although, FIG. 1 shows only one step portion 110, there can be one or more step portions depending upon the implementation without deviating from the overall concept of the present invention.

In addition, the can part 100, the supports 300 and the insulator parts 400 may be made of a nonconductor, and the split cores 200 and the outer ring 600 may be made of a conductor. The can part 100, the supports 300, the insulator parts 400 and the split cores 200 may also be integrally insert-molded in which the split cores 200 are respectively inserted inside the supports 300.

Therefore, unlike the related-art art in which the can part 100 is separately extruded and components are individually assembled, the number of components required during assembly is reduced dramatically, thereby reducing the manufacturing cost. Since the components for assembling the cap part 100 are precluded, no assembly gaps (air gaps) are formed, thereby reducing noise. Also, since the can part 100, the supports 300, the insulator parts 400 and the split cores 200 have an integrated structure in which the split cores 200 are inserted into the supports 300, they have superior tolerance to vibration and impacts that occur when the pump is rotating.

FIG. 3 is a cross-sectional view taken along line B-B in FIG. 2 and FIG. 4 is a cross-sectional view taken along line B-B in FIG. 2, and specifically show the inserted shape of the split cores 200 in FIG. 3. While the split cores 200 can be shaped as simple rectangular cross-sectional columns, it is possible to further optimize the shape of the split cores 200. Specifically, each split core 200 includes a winding portion 210, a fixing portion 230, a protrusion 250 and the outermost end 270.

The winding portion 210 may be shaped as a rectangular cross-sectional column that extends a certain length in the radial direction of the can part 100. The coils 500 may be wound substantially around the outer circumference of the winding portion 210.

In addition, one end portion of each split core 200 is fixed to the can part 100, and the other end portion of the winding portion 210 is fixed to the corresponding insulator 400. Since one end portion of each split core 200 must be firmly fixed to the can part 100, the fixing protrusion 230 provided on one end of the winding portion 210 has a taper that widens in the direction toward the can part 100 when viewed from above. In this fashion, the fixing portion 230 may have a trapezoidal cross-section, so that one end portion of each split core 200 can be more firmly fixed and supported. At the other end portion of each split core 200, the protrusion 250 protrudes outward from the other end of the winding portion 210 in the radial direction of the can part 100. The protrusion 250 may penetrate into and may be coupled with the corresponding insulator 400.

As described above, since the outer ring 600 and the divided split cores 200 are applied, once each coil 500 is wound on the corresponding winding portion 210, the outer ring 600 is assembled. As such, it is easy to concentrically wind the coils and to minimize an air gap (not shown), thereby improving the performance characteristic of the motor.

In particular, the coils 500 may be wound on the outer surface of the winding portion 210 of the split core 200. The outer portions of the winding portion 210 and the fixing portion 230 of the split core 200 may also be electrically isolated when they are surrounded by the supports 300 which are made of a nonconductive material.

In addition, the protrusion 250 of the split core 200 may extend through the corresponding insulator part 400 so that the outermost end 270 of the split core 200 is exposed to the outside. The outermost surfaces defined by the outermost end 270 of the protrusion 250 and the corresponding insulator 400 may by shaped in the form of an arc that is convex in a lateral direction (when viewed from above) such that the outermost surfaces of the outermost end 270 and the insulator 400 form one plane. In this fashion, the outermost surfaces of the outermost ends 270 and the insulator parts 400 form a concentric circle with the can part 100, and the outer ring 600 is fitted on the outermost surfaces of the outermost ends 270 and the insulator parts 400.

Accordingly, the protrusions 250 of the split cores 200 which are made of a conductor extend through the insulator parts 400 such that the outermost ends 270 of the split cores 200 are exposed to the outside, and the outer ring 600 which is made of a conductor is fitted on the outermost surfaces of the split cores 200 and the insulator parts 400. The outermost surfaces of the protrusions 250 and the insulator parts 400 are brought into close contact with the outer ring 600 such that an air gap (not shown) having a minimum size is provided therebetween. This can consequently improve the performance characteristics of the motor, and the size of the air gap (not shown) can vary depending on the design.

Although a preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A canned motor pump comprising:
    a pipe-shaped can part which accommodates a rotor;
    a plurality of supports protruding radially outward from an outer periphery of the can part;
    a plurality of split cores, wherein each of the plurality of the split cores is inserted inside a corresponding support of the plurality of supports, and all parts of the split cores are installed separately from the outer periphery of the can part without exposing the parts of the split cores to an inner space in the can part, and wherein one end portion of each of the plurality of split cores is fixed to the can part without penetrating the can part;
    a plurality of insulator parts, wherein each of the plurality of insulator parts is formed on a corresponding distal end of the plurality of supports, and each distal end of the plurality of the split cores extends in a direction toward a corresponding insulator part of the plurality of insulator parts;
    an annular outer ring surrounding an outer circumference of the plurality of insulator parts, an inner circumference of the outer ring adjoining to exposed outermost ends of the plurality of split cores; and
    a plurality of coils wound on the plurality of supports.

2. The canned motor pump according to claim 1, wherein the can part, the plurality of supports, the plurality of insulator parts and the plurality of split cores are integrally insert-molded so that the plurality of split cores are respectively inserted inside the plurality of supports.

3. The canned motor pump according to claim 1, wherein each of the plurality of split cores comprises:
    a winding portion extending a predetermined length in a radial direction of the can part, the winding portion being shaped as a rectangular cross-sectional column;
    a fixing portion provided on one end of the winding portion that is adjacent to the can part, the fixing portion forming a taper that widens in a direction toward the can part when viewed from above; and
    a protrusion protruding outward from another end of the winding portion.

4. The canned motor pump according to claim 3, wherein the plurality of coils are respectively wound on the winding portions of the plurality of split cores, and the plurality of supports are disposed between the plurality of split cores and the plurality of coils to provide insulation therebetween.

5. The canned motor pump according to claim 3, wherein the protrusions of the plurality of the split cores respectively penetrate through the plurality of insulator parts so that the outermost ends of the plurality of the split cores are exposed.

6. The canned motor pump according to claim 3, wherein outermost surfaces defined by the outermost ends of the protrusions of the plurality of split cores and the plurality of insulator parts are formed in a shape of an arc that is convex to outside in a lateral direction so that the outermost ends of the protrusions of the plurality of split cores and the outermost surfaces of the insulator parts form the arc shape and have a same curvature.

7. The canned motor pump according to claim 3, wherein outermost surfaces defined by the protrusions of the plurality of split cores and the plurality of insulator parts form a concentric circle with the can part, and the outer ring is fitted on the outermost surfaces of the protrusions of the plurality of split cores and the plurality of insulator parts.

8. The canned motor pump according to claim 7, wherein the outermost surfaces defined by the outermost ends of the protrusions of the plurality of split cores and the plurality of insulator parts are in close contact with the outer ring and are electrically conductive.

9. The canned motor pump according to claim 1, wherein the can part, the supports and the insulator parts are non-conductors, and the split cores and the outer ring are conductors.

10. The canned motor pump according to claim 1, wherein the can part has a stepped portion in a lower portion of the can part in which an inner diameter is reduced.

* * * * *